Oct. 25, 1932.  G. G. FORD  1,884,644
WELDING APPARATUS
Filed Jan. 25, 1930   2 Sheets-Sheet 1
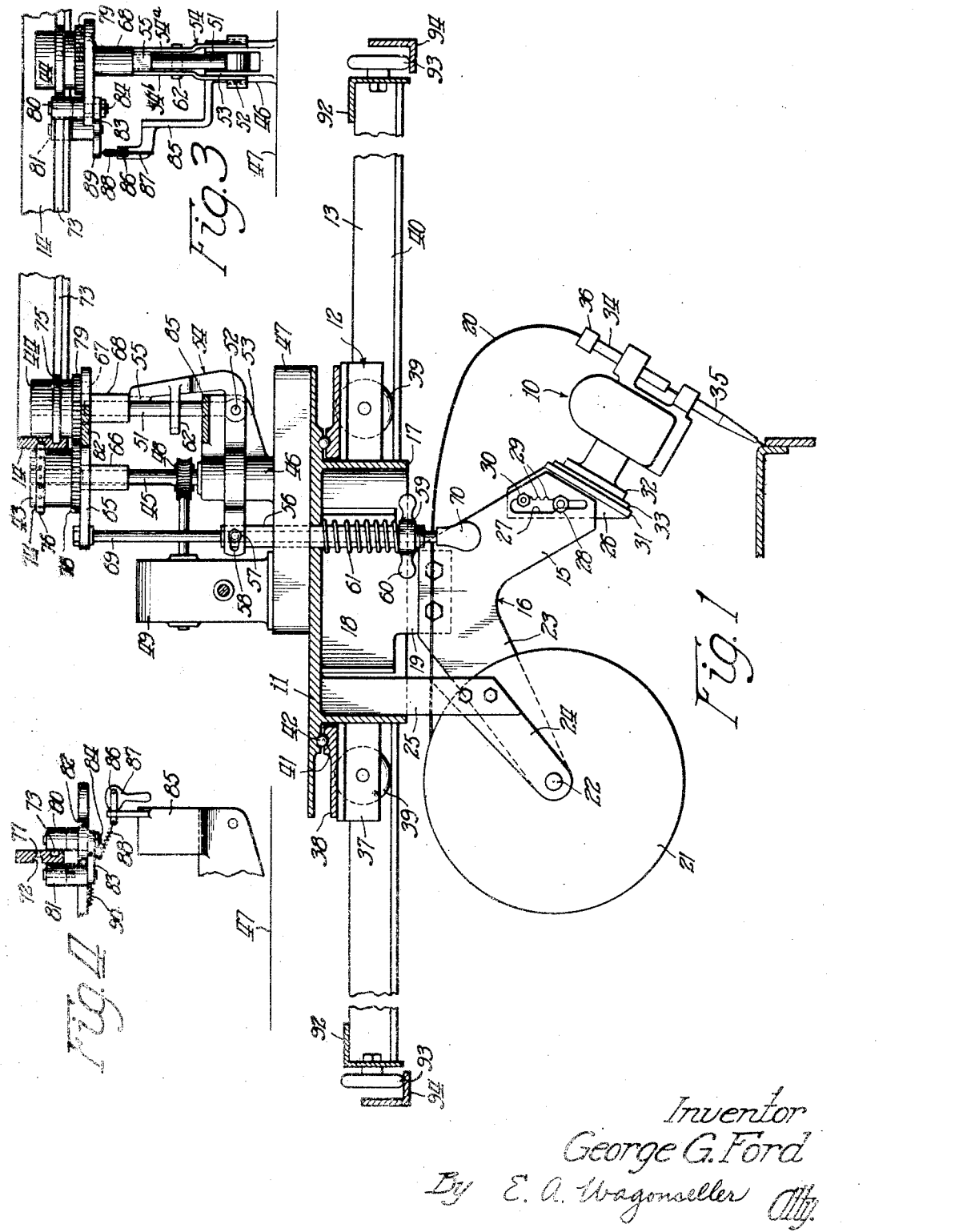
Inventor
George G. Ford
By E. A. Wagonseller Atty.

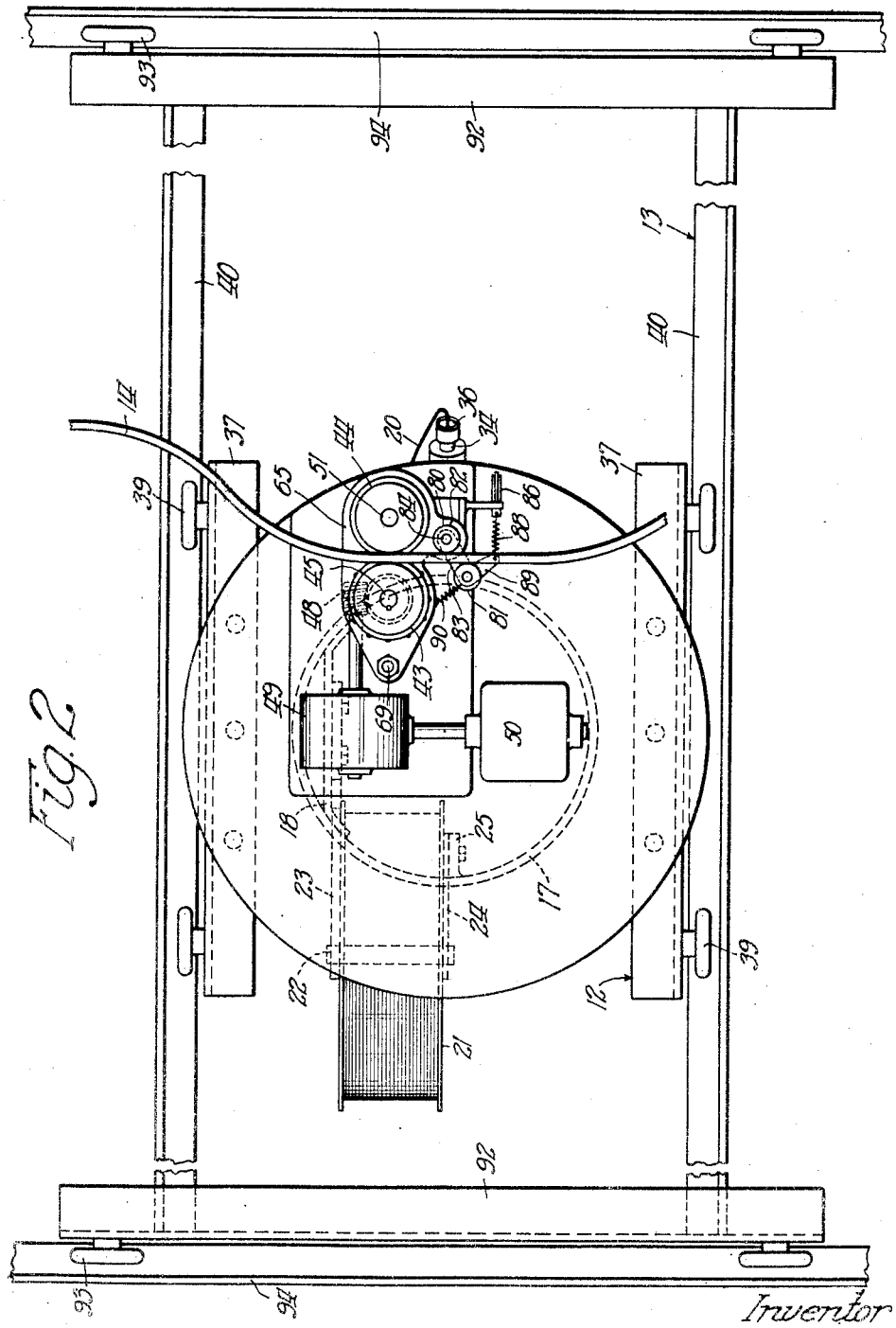

Patented Oct. 25, 1932

1,884,644

UNITED STATES PATENT OFFICE

GEORGE G. FORD, OF TERRE HAUTE, INDIANA

WELDING APPARATUS

Application filed January 25, 1930. Serial No. 423,305.

This invention relates to welding apparatus and more particularly to apparatus of this character for use with electric welding tools. One object of the invention is the provision of a welding apparatus of a rugged, dependable character, composed of relatively few and simple parts and requiring a minimum of care and attention in its use and operation. Another object of the invention is to provide a support for a welding tool which will readily permit universal movement of the tool throughout a substantial area. A further object of the invention is to provide a mounting and guiding means for a welding tool which will maintain the tool at all times in proper relation to the joint being welded. A still further object of the invention is to provide a readily engageable and disengageable connection between the welding tool and the guiding means for maintaining it in the desired path of movement.

To these and other ends the invention resides in certain improvements and combinations of parts, all as will be hereinafter more fully described, the novel features being pointed out in the claims at the end of the specification.

In the drawings:

Fig. 1 is a side elevation, partly in section, of a preferred embodiment of the present invention;

Fig. 2 is a plan view;

Fig. 3 is a detail view of a stabilizing device to assist in maintaining the tool in proper working relation to the work; and Fig. 4 is another detail view of the stabilizing device shown in Fig. 3.

Similar reference numerals through the several views indicate the same parts.

The present embodiment of the invention provides an efficient form of welding apparatus adapted for the welding of relatively large standardized articles and is particularly advantageous for use in welding in the heads of relatively large boilers, such as are used in low pressure heating plants, although the invention finds utility in numerous other welding processes which require the tool to be moved through an irregularly curved path of standardized contour. The invention, as disclosed, comprises a welding head with a welding tool thereon, the head being mounted for universal movement throughout a substantial area and being suitably guided so as to constantly maintain a proper operative relation between the tool and the joint to be welded.

Referring more particularly to the drawings, which illustrate a preferred embodiment of the invention, the welding head 10 is mounted for free rotative or angular movement on a turntable 11 which is supported for bodily movement by a carriage 12 mounted so as to be in turn freely movable along a travelling support 13. A guide track 14, suitably supported, cooperates, through the intermediary of contact means mounted in fixed relation to the tool, to maintain the tool in proper working position with respect to the joint to be welded.

In the present description of the invention the welding head has been represented as including an electric welding tool employing a metallic electrode but the device is equally useful with a carbon arc welding tool as well as with other types of welding tools utilizing the combustion of gases to produce the necessary heat.

The welding head 10 is preferably mounted below the turntable 11 on an arm 15 of an inverted V-shaped frame member 16. The frame member 16 is supported from the turntable by means of a circular flange 17 welded or otherwise attached to the under surface of the turntable 11. Within the flange 17 is secured a cross member 18 provided with a depending extension 19 to which the frame member 16 is suitably secured in a detachable manner as by means of bolts.

A supply of electrode wire 20 is carried by the turntable 11 by means of a reel 21 mounted on a spindle 22 having one end supported in the opposite extended arm 23 of the frame member 16. The other end of spindle 22 is carried by an arm 24, the upper end of which is detachably secured to a depending bar 25 welded or otherwise secured to the circular flange 17. The electrode wire or welding rod 20 is arranged to be fed by the welding head so as to lie along the joint being welded and to cause the meeting surfaces, when heated to the proper temperature, to become thoroughly bonded into a unitary structure.

Means are preferably provided to enable the welding head to be adjusted toward and from the turntable to provide for ready accommodation of the tool to various types of work. In the present instance the welding head 10 is supported on the arm 15 of frame member 16 by means of a plate 26 adjustably secured thereto. The arm 15 is provided with an opening or slot 27 adapted to receive a bolt 28 threaded into the plate 26. One edge of the slot or opening 27 is formed with a series of notches 29 adapted to selectively receive a bolt 30 also threaded into the plate 26. The plate 26, as shown in Fig. 1, is in its uppermost position and when it is desired to lower the welding head the bolts 28 and 30 are first loosened and then the welding head is tipped slightly upward around bolt 28 as a pivot to permit the plate 26 to slide downwardly with respect to arm 15.

When the plate 26 has been moved to its desired lower position the head is tilted back toward its original position so that the bolt 30 will be received within a lower notch 29 after which both bolts 28 and 30 are tightened against arm 15 to hold plate 26 tightly in engagement therewith.

A transversely disposed, inclined plate 31 is suitably secured to the lower edge of the vertical plate 26 so as to serve as a supporting base for the welding head 10. The welding head, as shown, is of a generally conventional form and includes a securing plate 32 adapted to be bolted or otherwise secured to the plate 31 with an insulating pad 33 therebetween. The position of the welding head is preferably inclined when it is desired to weld a lap joint such as indicated in Fig. 1; but if it is desired to weld a simple butt joint the welding tool will be disposed substantially vertically. This may be accomplished by modifying plate 26 so as to support the plate 32 in a vertical instead of an inclined position.

The welding tool proper includes a pair of aligned tubular members 34 and 35. The member 34 is provided with a flared receiving mouth portion 36 to facilitate feeding of the wire 20 therein. The member 35 serves to deliver the wire 20 to the joint which is to be welded. The point of delivery of the wire 20 to the joint to be welded may be considered the working point of the tool. The welding head, being of a generally conventional form, requires no further description other than to state that provision is made for a supply of current through the welding head and into member 35 of the welding tool from whence the current passes along the wire 20 and into the material being welded, and thus generates the necessary welding heat. The welding head 10 also provides means, not shown, for positively feeding the wire 20 off its reel and down through the aligned tubular members 34 and 35 of the welding tool.

The carriage 12 comprises side frame members 37, 37 held in proper spaced relation by a circular base member 38 for the turntable 11. Suitable rollers or wheels 39, 39 are arranged to support the carriage 12 for travel along tracks provided by the longitudinal frame members 40, 40 of the travelling support 13. Suitably formed on the circular base member 38 is a ball race 41 supporting ball bearings 42 which in turn rotatably support the turntable 11.

As previously stated, the welding tool is designed to be guided in its movement by a contact means engaging the guide track 14 and fixedly mounted with respect to the tool. In the present embodiment of the invention this contact means comprises a pair of main rollers 43 and 44 arranged for relative separating movement as well as for raising and lowering movement so as to permit the rollers to engage the guide track 14 or be disengaged therefrom.

In the present instance the roller 43 is suitably keyed for raising and lowering movement on a vertical driven shaft 45. The shaft 45 is supported in a bearing 46 mounted on a suitable base member 47 located on turntable 11. The shaft 45 is rotated by means of worm gearing 48 connected through a suitable gear reduction unit 49 with a motor 50. The motor 50 is preferably mounted directly on the top of turntable 11 and the gear reduction casing is, in the present instance, mounted on the base member 47.

The roller 44 is slidably mounted and also mounted so as to freely rotate on a spindle 51 having its lower end formed with an eye through which passes a pin or bolt 52 supported in a lug or bracket 53 which, as shown, is preferably formed integral with the bearing 46. By this construction and arrangement the roller 44 may be bodily swung away from its companion roller 43 so as to provide a substantial space therebetween to facilitate the upward movement of the rollers into a position where they will embrace the track when brought toward each other again.

Means are preferably provided for holding roller 44 yieldingly in place against guide track 14. This means, in the present instance, comprises a bell crank lever 54 pivoted on the pin 52. The bell crank lever 54 is made up of two sections 54a and 54b which straddle the bracket 53 and the bearing 46 and are joined at their upper ends to provide a contact portion 55 which bears against the swinging spindle 51. The horizontal portions of the bell crank lever 54 are pivotally connected to a vertically movable link member which, in the present instance, is in the form of a hollow metal tube or sleeve 56. Into each side of the sleeve 56 is threaded a machine screw 57 which engages within an aperture 58 in the ends of the horizontal members of the bell crank lever. Thus the sleeve 56 and bell crank lever are pivotally connected. The aperture 58 is preferably elongated to provide a small amount of lost motion in the pivotal connection.

The sleeve 56 passes downwardly through a suitable aperture in the base member 47 and turntable 11 and terminates in a threaded section onto which is threaded a wing nut 59 having wings or handle portions 60 to facilitate manual rotation thereof. A compression coil spring 61 is interposed between the nut 59 and the under surface of the turntable to cause the sleeve 56 to be urged to a lowered position whereby the contact member 55 of the bell crank lever will be in constant yielding engagement with the spindle 51. By rotating the wing nut 59 in the appropriate direction it is apparent that the tension of spring 61 may be increased or diminished to correspondingly increase or diminish the pressure exerted on spindle 51 by the upper end of the bell crank lever 54.

By the arrangement of parts just described it is possible, by an upward pressure upon the wing nut 59, against the compression of spring 61, to remove the upper end of bell crank 55 from contact with the spindle 51 whereby the spindle may swing to the right as viewed in Fig. 1. In order to positively swing the spindle 51 a U-shaped member or yoke 62 is provided which surrounds the spindle 51 and has its terminal ends secured to or formed integrally with the sides 54a and 54b of the bell crank lever 54. Thus when the upper end of the bell crank 54 is swung to the right, as viewed in Fig. 1, the closed end of the yoke 62 will contact the spindle 51 and positively move it toward the right and out of engagement with the guide track 14.

As previously described, the main rollers 43 and 44 are vertically slidable on their respective shaft and spindle. Means are preferably provided for positively moving the rollers from their lower to their raised position and vice versa. For this purpose there is provided a plate 65 having an aperture adapted to receive a hub portion 66 of the roller 43 and having another aperture, indicated at 67, adapted to receive the hub section 68 of the roller 44. The aperture 67 is elongated, as indicated by dotted lines in Fig. 1, in order to permit separating movement of the rollers. A rod 69 is secured to one end of the plate 65 and passes downwardly through the sleeve 56 so as to project below the end thereof. The free end of this rod is provided with a suitable handle member 70 by means of which the rod may be conveniently raised and lowered in order to raise and lower the rollers 43 and 44.

The arrangement of the hub 68 and upper end of bell crank lever 54 is such that, when the roller 44 is in its raised position, the upper end of the bell crank lever will engage beneath the lower edge of the hub 68 to thus positively hold the roller 44 in its raised position so long as the contact member 55 of the bell crank is bearing against the spindle 51.

The rollers 43 and 44 may be constructed in various manners but, in the present instance, it is deemed preferable to construct the treads of the rollers contacting the guide track so that there will be no slippage of either roller when they are running along curved sections of the guide track so that, even when the rollers are positively driven in synchronism there will be no slippage. Means are also provided for insuring positive contact between at least one of the rollers and the guide track. In carrying out the above ends the guide track 14 is preferably formed with a pair of offset grooves 72 and 73 which receive respectively raised tread portions 74 and 75 of the respective rollers 43 and 44. The tread portion 74 is preferably formed of suitable metal or equivalent wear-resisting material. On the surface of the treated portion 74 that is provided a plurality of projections or nubs 76 which are adapted to engage within spaced openings or apertures 77 in the guide track which may be conveniently formed by drilling therethrough. The particular manner in which the openings 77 are formed is, in general, immaterial. The tread portion 75 is preferably faced with suitable friction material such as rawhide to insure the maintainence of snug engagement with the inner face of groove 73.

The rollers 43 and 44 are respectively provided with pinions 78 and 79 which intermesh and insure the synchronous rotation of the rollers.

The grooves 72 and 73 are so formed that their inner faces are substantially in vertical alignment whereby the tread surfaces of the tread portions 74 and 75 will be disposed in substantially the same manner as though they were contacting each other with no interposed track therebetween. In this way there will be no likelihood of one of the rollers slipping on the curves in spite of the fact that they are positively driven in synchronism.

It is appropriate to note at this point that the line of contact between the treads 74 and 75 and the guide track 14 is disposed at substantially the same distance from the axis of the turntable as the distance between the working point of the tool and the axis of the turntable. In other words, the rollers 43 and 44 are symmetrically disposed with respect to a line passing through the working point of the welding tool and lying parallel with the axis of the turntable.

In order to insure the proper position of the working point of the tool at all times no matter what may be the curve of the guide track 14 there is provided, as a part of the contact means, a stabilizing arrangement in the form of a pair of auxiliary rollers 80 and 81 contacting opposite sides of the track at points closely adjacent to the main rollers 43 and 44. The roller 80 is preferably mounted on an extension 82 of the plate 65 and the roller 81 is supported upon an arm 83 which is pivotally supported on a pin 84 engaged in the extension 82 and also serving as the spindle for roller 80. Thus it will appear that the auxiliary or stabilizing rollers 80 and 81 are mounted for raising and lowering movement in unison with the rollers 43 and 44.

Means are provided for yieldingly holding the stabilizing roller 81 against the track (see Fig. 2). For this purpose there is provided an upwardly extending bracket 85 on the previously described bracket 53. The extreme upper end of bracket 85 is provided with an aperture through which passes a bolt 86 having one end bifurcated so as to pivotally receive a cam shaped member 87 by means of which the bolt may be extended or retracted as will be readily apparent from Fig. 4. A coil spring 88 is secured at one end of bolt 86 and at its other end is connected to an extended portion 89 of the arm 83. As the bracket 85 is stationary, being mounted on the bracket 53, the parts are preferably so arranged that the spring 88 will be inclined upwardly in the upper position of the rollers and will be inclined downwardly in their lower position. When it is desired to lower the rollers from engagement with the track 14 the cam member 87 is swung upwardly to the right as shown in Fig. 4 thus permitting the bolt 86 to move toward the left to release the tension on spring 88. This permits roller 81 to be swung to a position in which the axes of the stabilizing rollers 80 and 81 lie along a line of substantially right angles to the guide track thus facilitating downward movement of these rollers out of engagement with the guide track In order to positively swing roller 81 to its most advantageous position for lowering movement there is provided a light coil spring 90 (see Figs. 2 and 4) which is capable of swinging the arm 83 clockwise, as viewed in Fig. 2, when the tension of spring 88 has been released.

The purpose and function of the stabilizing rollers will now be explained. For certain types of welding work the curvature of the guide track must necessarily be on a very short radius and there is a tendency for the point of the welding tool to get out of proper operative relation to the work when only rollers 43 and 44 are relied upon. This may be explained by supposing that the track just adjacent the portion of short radius curves toward the left as viewed in Fig. 2. In other words, the rollers may be considered as moving from a relatively straight or slightly curved portion to a portion of smaller radius which curves to the right when looking in the direction of movement. When the rollers 43 and 44 are moving along the straight or slightly curved portion of the guide track there is a tendency for the center of the turntable to lag slightly behind. This is because the pulling force is ordinarily exerted at a point somewhat to one side of the center of gravity of the system including turntable 11, carriage 12 and support 13 which provides for universal bodily and angular movement of the welding tool. Therefore, when the rollers reach a portion of the guide track having a smaller curvature, for example, to the right, looking in the direction of their movement, the rollers will then no longer be pulling the system but there will be produced a backward movement of the axis of the turntable and a reverse movement of the carriage 12 and its support 13. The presence of stabilizing roller 80 prevents this tendency of the tool to be thrown out of proper alignment due to the fact that the turntable axis will be prevented from lagging behind as would be the case where only one set of rollers (43 and 44) is used.

It has been found in practice that the best results are obtained by locating the axis of stabilizing roller 80 in substantially the same radial plane through the axis of the turntable as the working point of the tool, see Fig. 2. In other words the line which passes through the working point of the tool and parallel to the axis of the turntable passes substantially through the axis of roller 80. By this arrangement the working point of the tool is maintained at all times in substantially the same relation with a tangent to the line of curvature of the joint to be welded drawn at the working point of the tool.

The travelling support 13 comprises the previously mentioned longitudinal frame members 40, 40 which may be suitably formed from fabricated shapes so as to present tracks for rollers 39 of the carriage 12. The frame members 40, 40 have their ends secured in end frame members 92, 92 each of which supports a pair of rollers or wheels 93, 93 adapted to travel along suitable tracks 94, 94 supported above the object to be welded.

Current is supplied to the welding head and to motor 50 in any desired manner as for example, by means of a flexible cable. It will be understood, however, that the article to be welded is suitably grounded so as to convey the current supplied to the welding head back to its source.

The operation of the device will now be described. Assuming that the object to be welded is a boiler and it is desired to weld the head of the boiler onto the side walls—the side walls and head will be arranged together beneath the welding device so that the joint to be welded will lie in a plane substantially parallel with the plane through which the end of the welding tool is adapted to move. The curvature of the guide track employed will be identical with the curvature of the joint.

If the rollers 43, 44, 80 and 81 are not in engagement with the guide track the operator will first move the turntable and carriage 12 and support 13 so as to bring the rollers directly beneath the guide track; he will next push upwardly on the handle member 60 to permit roller 44 to move away from roller 43. The next step is to see that the stabilizing rollers 80 and 81 are so arranged that there will be space enough between them to facilitate their being moved into embracing relation with the guide track. This is done by releasing the tension on the spring 88 in the manner previously described so as to permit spring 90 to move roller 81 toward roller 43.

With all four rollers in the position just described the operator will press upwardly on the handle 70 to raise the rollers into proper working condition with respect to the guide track. He will next release pressure on the wing nut 59 whereby the sleeve 56 will be moved downwardly and the upper end of bell crank lever 54 will force the spindle 51 to the left as viewed in Fig. 1, this will bring the rollers 43 and 44 into engagement with the guide track as illustrated. After the rollers 43 and 44 are in place the operator will swing downwardly on the handle of the cam member 87 so as to move the bolt 86 to the right as viewed in Fig. 4. The stabilizing roller 81 is thus brought into engagement with the guide track as shown in Figs. 2 and 4.

By reference to Fig. 1 it is apparent that the rollers 43 and 44 will be held in raised position due to the engagement of their tread portions within the grooves 72 and 73. The hub 68 of roller 44, by bearing upon the upper end of bell crank lever 54 will thus serve as an additional means for maintaining roller 44 in raised position. The gears 78, 79 will also be brought to intermeshing relation at the same time that the rollers engage the track. In order to cause the rollers 43 and 44 to engage the track more snugly it is only necessary to tighten the wing nut 59 as previously stated.

After the rollers have been placed in engagement with the guide track and the tool has been located in proper starting position the current is turned on to energize the motor 50 and rotate rollers 43 and 44. At the same time, or immediately after, the current to the motor is turned on current will also be supplied to the welding tool to initiate the welding operation. As the rollers carry the welding tool around the proper working path the welding wire 20 will be fed out through the point of the welding tool at the appropriate speed in a manner which is well understood. The turntable 11, carriage 12 and support 13 jointly cooperate to permit the free movement of the tool along the proper path. The turntable provides for the proper angular position and the carriage 12 and support 13 each take care of linear or bodily movement in one direction. The tool is thus mounted for universal, bodily and angular movement throughout a plane, the area of which is only limited by the length of the support 13 and the extent of movement of which the support 13 is capable.

The function and operation of the stabilizing rollers 80 and 81 has already been fully developed and it is not thought necessary to deal further with their function at this point except to state that these rollers effectively prevent the tool from getting out of proper alignment to the work and are especially effective for work which requires a guide track having portions of rather short radii.

The movement of the tool around the joint is thus continued until the entire circuit is complete after which the motor is stopped and the current flowing to the welding tool is cut off until another boiler is brought into position to be welded.

It will thus be apparent that the present invention provides a welding device capable of being readily brought into operative relation to a joint to be welded and after its operation has begun it requires no further attention until the entire joint has been welded. One operator may thus conveniently attend to several welding machines of this type. The mounting for the welding tool may be utilized with any of a variety of irregularly curved shapes and may be relied upon to always maintain the tool in proper relation to the work. The device is not limited as to the size of the object to be welded as, obviously, the range of operation may be increased by merely lengthening carriage 13 and increasing the distance which it may travel. The tool may be conveniently adjusted up and down to accommodate work extending upwardly from the floor to various heights. The device may, if desired, operate successively with several independently mounted guide tracks of the same or different contours by merely providing for a long enough track for the support 13.

The construction of the guide track 14 and its arrangement with the treads of rollers 43 and 44 is very advantageous for the reason that the rollers can be driven in absolute synchronism and there will not be any tendency for one roller or the other to slip with respect to the guide track when the rollers are driving on curved portions of the track. The arrangement is such that it is as though the rollers were operating upon a guide track having no thickness but great rigidity due to the fact that the surfaces of the grooves on which the treads contact are in substantial vertical alignment.

Accordingly, while the present description sets forth a preferred embodiment of the invention, it is apparent that numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A welding apparatus comprising in combination a welding tool, means for mounting said tool adapting it for free bodily movement in any direction throughout a given plane, additional means providing for angular movement of said tool, a guide track, contact means fixedly connected with said tool and arranged to engage the guide track whereby the tool is maintained at all times in substantially the same relation with respect to a tangent to the guide track drawn through the working point of the tool.

2. A propelling and guiding means for a tool comprising a bodily movable turntable adapted to support a tool, a guide track, a pair of rollers supported on the turntable and adapted to engage the track, means for moving said rollers toward and from embracing relation with said track, means for causing separating movement between the rollers, and resilient means tending to maintain the rollers in snug engagement with the track.

3. A propelling and guiding means for a tool comprising a bodily movable turntable adapted to support a tool, a guide track, a pair of rollers supported on the turntable and adapted to engage the track, means for moving said rollers toward and from embracing relation with said track, means for causing separating movement between the rollers, resilient means tending to maintain the rollers in snug engagement with the track, and means for driving at least one of the rollers.

4. A welding apparatus comprising in combination a movable support, a trackway thereon arranged transversely of the direction of movement of the support, a carriage mounted for travel on said trackway, a turntable on said carriage, a welding tool rotatably supported by the turntable, a guide track, contact means located on said turntable and adapted to engage said guide track, and means for moving said contact means selectively into and out of engagement with said guide track.

5. A welding or similar apparatus comprising in combination a tool, a guide track, contact means fixedly connected with said tool and engaging said guide track for maintaining said tool in proper position relatively to the work, supporting means providing for rotation of the tool so that it may follow the arc of a circle, additional means providing for free bodily movement of the tool throughout a substantial area, and means for selectively engaging and disengaging the contact means with the guide track.

6. A welding apparatus comprising in combination a turntable, a welding tool supported thereby, means supporting the turntable adapted to provide for bodily movement thereof throughout a substantial area, and a storage device supported by the turntable for supplying welding wire to the welding tool.

7. A welding apparatus comprising in combination a welding tool, means for supporting said tool adapting it for free bodily and free rotative movement throughout a substantial area, a guide track, contact means fixedly connected with the welding tool and arranged to engage the guide track whereby the tool is maintained at all times in substantially the same relation with respect to a tangent to the guide track drawn through the working point of the tool, said contact means comprising a pair of rollers each adapted to contact one side of the guide track, and means for driving at least one of said rollers.

8. A welding apparatus comprising in combination a welding tool, means for supporting said tool adapting it for free bodily and free rotative movement throughout a substantial area, a guide track, contact means connected with the welding tool and arranged to engage the guide track whereby the tool is maintained at all times in substantially the same relation with respect to a tangent to the guide track drawn through the working point of the tool, said contact means comprising a pair of rollers each adapted to contact one side of the guide track, means for moving said rollers into and out of engagement with the track, and means for driving at least one of said rollers.

9. A welding apparatus comprising in combination a movable support, a trackway thereon arranged transversely of the direction of movement of the support, a carriage mounted for travel on said trackway, a turntable on said carriage, a welding tool mounted in fixed relation to said turntable, a guide track, contact means located on said turntable and adapted to engage said guide track, said contact means comprising a pair of rollers each adapted to contact one side of the guide track, manually operable means for moving the rollers toward and from the guide track and manually operable means for moving one of the rollers toward and from the other roller whereby said rollers may be readily engaged with or disengaged from the guide track.

10. A welding apparatus comprising in combination a welding tool supported for movement throughout a substantial area, means adapted to provide for rotative movement of said tool about an axis spaced from the working end of said tool, a guide track, contact means connected in fixed relation to said tool and adapted to engage said guide track, said contact means being spaced from the axis of rotation of said tool a distance substantially equal to the spacing of the working end of said tool from said axis, said contact means comprising a pair of main rollers adapted to contact said guide track from opposite sides and a pair of stabilizing rollers also adapted to contact said guide track from opposite sides, means for moving said main rollers and stabilizing rollers toward and from said guide track, and means for causing separating movement respectively between each of said pairs of rollers.

11. A welding apparatus comprising in combination a turntable adapted to support a welding tool, means movably supporting said turntable for movement throughout a substantial area, a supporting frame member depending from said turntable, a welding head comprising a welding tool and a plate for supporting said welding head on said frame, said frame member having an elongated opening therein, a bolt threaded into said supporting plate and passing through the elongated opening, the upper portion of the opening being provided with a series of notches disposed on the side of said opening toward the center of gravity of the welding head, an additional bolt threaded into said supporting plate above said first mentioned bolt and adapted to be selectively received into said notches whereby the welding head may be conveniently adjusted toward or from the turntable and held in various positions with respect thereto.

12. A welding apparatus comprising in combination a welding tool supported for movement throughout a substantial area, means adapted to provide for rotative movement of said tool about an axis spaced from the working end of said tool, a guide track, contact means connected in fixed relation to said tool and adapted to engage said guide track, said contact means comprising a pair of rollers adapted to bear against opposite sides of the guide track, means for moving said rollers toward and from said guide track, and means for causing separation of said rollers to facilitate their engagement with said track.

13. A welding apparatus comprising in combination a welding tool supported for movement throughout a substantial area, means adapted to provide for rotative movement of said tool about an axis spaced from the working end of said tool, a guide track, contact means connected in fixed relation to said tool and adapted to engage said guide track, said contact means comprising a pair of rollers adapted to bear against opposite sides of the guide track, means for moving said rollers toward and from said guide track, resilient means tending to draw the rollers toward each other and means for causing separation of said rollers to facilitate their engagement with the track.

14. A welding apparatus comprising in combination a welding tool supported for movement throughout a substantial area, means adapted to provide for rotative movement of said tool about an axis spaced from the working end of said tool, a guide track, contact means connected in fixed relation to said tool and adapted to engage said guide track, said contact means comprising a pair of rollers adapted to bear against opposite sides of the guide track, means for moving said rollers toward and from said guide track, channels formed in the guide track, projecting tread means on the rollers adapted respectively to engage within said channels, and means for causing separation of the rollers to facilitate their engagement with the track.

15. A welding apparatus comprising in combination a welding tool supported for movement throughout a substantial area, means adapted to provide for rotative movement of said tool about an axis spaced from the working end of said tool, a guide track, contact means connected in fixed relation to said tool and adapted to engage said guide track, said contact means comprising a pair of rollers adapted to bear against opposite sides of the guide track, means for moving said rollers toward and from said guide track, channels formed in the guide track, projecting tread means on the rollers adapted respectively to engage within said channels, resilient means tending to draw the rollers toward each other, and means for causing separation of the rollers to facilitate their engagement with the track.

16. A welding or similar apparatus comprising in combination a tool, a guide track, means fixedly connected with said tool and engaging said guide track for maintaining said tool in proper position relatively to the work means for supporting said tool adapting it to be rotated so that the tool follows the arc of a circle, and additional means providing for free bodily movement of said tool throughout a substantial area.

17. A welding or other apparatus comprising in combination a tool supported for movement throughout a substantial area, means adapted to provide for rotative movement of said tool about an axis spaced from the working end of said tool, a guide track having reverse curves therein, contact means connected in fixed relation to said tool and adapted to engage said guide track, said contact means comprising a pair of rollers adapted to engage against said guide track from opposite sides, channels formed in said guide track in opposite faces thereof and offset from each other, the depth of said respective channels being such that the inner faces thereof are in substantial alignment, projecting tread means on said rollers adapted respectively to engage within said channels, and means for causing separation of the rollers to facilitate their engagement with the guide track.

18. A welding apparatus comprising in combination a welding tool supported for movement throughout a substantial area, means adapted to provide for rotative movement of said tool about an axis spaced from the working end of said tool, a guide track, contact means connected in fixed relation to said tool and adapted to engage said guide track, said contact means being spaced from the axis of rotation of said tool a distance substantially equal to the spacing of the working end of said tool from said axis, said contact means comprising a pair of rollers adapted to contact said guide track from opposite sides and an auxiliary contact device adapted to grip the guide track, means for moving said rollers into and out of engaging contact with said track and means for releasing said auxiliary contact device from gripping contact with the track.

19. A device of the class described comprising a track formed from a flat bar, said track having offset tread surfaces formed by cutting away portions of the opposite faces thereof so that such surfaces are in substantial alignment, there being a sufficient amount of material of the bar between the two tread surfaces to substantially retain the initial rigidity of the bar between said surfaces and to maintain them in substantial alignment.

20. A device of the class described comprising a guide track for cooperation with traction rolls, said track having grooves formed in opposite faces thereof and offset with respect to each other, the bottoms of said grooves being in substantial alignment and parallel with the surface of said track whereby tread engaging surfaces will be provided on which traction rolls will travel at substantially the same surface speed irrespective of the general curvature of the track.

21. A device of the class described comprising a guide track for cooperation with traction rolls adapted to be positively driven together at a uniform surface speed, said track having offset tread receiving surfaces on opposite sides thereof, said surfaces being in substantial alignment whereby the treads of the rolls may be positively driven therealong at the same surface speed without slippage on said surfaces irrespective of the general curvature of the track.

22. A device of the class described comprising in combination, a pair of traction rolls having the tread surfaces thereof offset with respect to each other but with the adjacent peripheral edges of said treads in alignment, means for positively driving said rolls at the same tread surface speed, a track formed in a single piece and having offset tread receiving surfaces disposed on opposite sides thereof adapted to receive the treads of said rolls, whereby no slippage of the treads on the track will occur irrespective of the general curvature thereof.

Signed at Terre Haute this 17th day of January, 1930.

GEORGE G. FORD.